COMMUNICATION SYSTEM EMPLOYING PULSE CODE MODULATION

Original Filed Feb. 21. 1946 6 Sheets-Sheet 1

INVENTORS: B. M. OLIVER
C. E. SHANNON
BY [signature]
ATTORNEY

COMMUNICATION SYSTEM EMPLOYING PULSE CODE MODULATION

INVENTORS: B. M. OLIVER
C. E. SHANNON
BY George C Lord
ATTORNEY

July 30, 1957 B. M. OLIVER ET AL 2,801,281

COMMUNICATION SYSTEM EMPLOYING PULSE CODE MODULATION

Original Filed Feb. 21, 1946 6 Sheets-Sheet 3

INVENTORS: B. M. OLIVER
C. E. SHANNON
BY George C Lord
ATTORNEY

COMMUNICATION SYSTEM EMPLOYING PULSE CODE MODULATION

Original Filed Feb. 21, 1946 6 Sheets-Sheet 4

INVENTORS: B. M. OLIVER
C. E. SHANNON
BY George C. Ford
ATTORNEY

July 30, 1957 B. M. OLIVER ET AL 2,801,281

COMMUNICATION SYSTEM EMPLOYING PULSE CODE MODULATION

Original Filed Feb. 21, 1946 6 Sheets-Sheet 5

INVENTORS: B. M. OLIVER
C. E. SHANNON
BY George C. Ford
ATTORNEY

INVENTORS: B. M. OLIVER
C. E. SHANNON
BY George C Lord
ATTORNEY 2,801,281

COMMUNICATION SYSTEM EMPLOYING PULSE CODE MODULATION

Bernard M. Oliver, Palo Alto, Calif., and Claude E. Shannon, Chatham, N. J., assignors to Bell Telephone Laboratories, Incorporated, New York, N. Y., a corporation of New York Continuation of application Serial No. 649,347, February 21, 1946. This application September 17, 1952, Serial No. 310,046

8 Claims. (Cl. 178—43.5)

This application is a continuation of our application Serial No. 649,347, filed February 21, 1946.

This invention relates to communication systems for the transmission of complex wave forms by means of code groups of a plurality of different types or different signalling conditions transmitted at high speed. Typical types of wave forms suitable for transmission by means of such code groups of pulses are encountered in speech, music, sound, telegraph signals, mechanical vibrations and picture transmission systems.

The object of the present invention is to provide an improved communication system capable of transmitting and reproducing with high fidelity a complex wave form by means of code groups of pulses transmitted over an electrical transmission path in such a manner that the signal-to-noise ratio of the received signal is materially improved, and at the same time the frequency band width required for transmission of the signals is kept at a minimum.

Another object of this invention is to provide improved and simplified methods and apparatus capable of transmitting and receiving signal pulses over a noisy channel and deriving therefrom signals having a high signal-to-noise ratio.

In the past various communication systems have been proposed for improving the signal-to-noise ratio of received signals. In one such system the amplitude of the signal wave to be transmitted is sampled at successive intervals and pulses having either their beginnings, or terminations, or both a function of the amplitude of the complex waves are transmitted. While such systems may secure an improved signal-to-noise ratio, they require a wider frequency band than is required by the present system to effect a given improvement in the signal-to-noise ratio.

Other systems have been proposed in which a group of pulses is transmitted over a plurality of separate transmission paths. Such an arrangement is complicated and cumbersome and requires a plurality of transmission paths for the transmission of each of the complex waves to be transmitted.

A feature of this invention relates to a simplified and improved sampling arrangement for obtaining changes of an electrical quantity that are proportional to, or a function of, the instantaneous amplitude of a complex wave at predetermined instants.

Another feature of this invention relates to measuring equipment for determining the magnitude of an electrical quantity by reducing its magnitude by a plurality of small steps of equal amplitude and counting the number of steps required to reduce the magnitude of said electrical quantity to a predetermined value.

Another feature of this invention relates to a high speed storing arrangement for storing a plurality of electrical conditions and controlled by the number of steps or pulses counted by the counting arrangement.

Still another feature of this invention relates to an electrical distributing or transmitting arrangement for transmitting pulses in succession under control of stored information.

Another object of this invention is to provide repeating equipment for receiving, amplifying, and selecting a suitable portion of the received pulses and then accurately reforming the pulses both as to shape or wave form and as to time of occurrence.

Another object of this invention relates to improved receiving and decoding methods and apparatus for systems utilizing permutation code groups of pulses.

Still another feature of this invention relates to apparatus for rendering the repeating and receiving apparatus insensitive, blocked, or cut off except at the instants of time when pulses may be transmitted to the receiver.

A feature of this invention relates to a receiving device incorporating a network including a condenser and resistance connected in parallel to which received pulses are applied. In the exemplary system described hereinafter incorporating the present invention, the magnitudes of the condenser and resistor are so related to each other and to the pulses that the charge upon the condenser will change to one-half of its previous value during the interval of time between the centers of two adjacent pulse intervals.

A further object of this invention is to generate a plurality of pulses of varying magnitude under control of the potential across a parallel combination of a resistor and condenser.

Still another object of this invention relates to circuits for and methods of reconstructing complex wave forms from a plurality of pulses of varying magnitude representing the amplitude of the desired complex wave at predetermined instants.

Briefly, in an exemplary system embodying the present invention, a complex wave form is sampled at frequently recurring intervals of time, the frequency of which is determined by the maximum frequency component of the complex wave form to be transmitted. In sampling the complex wave form a charge is stored upon a condenser in such a way that the charge upon the condenser, or the voltage across the condenser is proportional to or is a function of the instantaneous amplitude of the complex wave form at the instant each of the samples is taken.

The magnitude of the charge or voltage of the condenser is then measured by changing or reducing its magnitude by a plurality of successive steps of substantially equal magnitude and counting the number of steps required to change the voltage across the condenser to a predetermined fixed or reference voltage. A counting mechanism is employed to count the number of steps required to change the voltage on a condenser by the required amount. In the exemplary system embodying the present invention, a so-called binary type of counter is employed.

At the end of the counting interval, the setting of the binary counter is transferred to storage circuits where the conditions of the various elements of the binary counter are stored upon storage condensers. A storage condenser is provided for storing the condition of each stage of the binary counter. Thereafter a code group of pulses is transmitted under control of the charges stored upon the respective storage condensers. Such code groups of pulses are frequently called permutation code groups or binary code groups of pulses.

In addition, a synchronizing pulse is transmitted for each code group of signalling pulses. The synchronizing pulse is transmitted to maintain the receiving equipment in proper phase with respect to the transmitting equipment, so that the received permutation code groups of pulses may be properly decoded and the complex wave form reconstructed therefrom.

Due to the action of the system in first determining the magnitude of each sample and then storing this information and later transmitting a series of pulses representing the magnitude of each sample, it is possible first to determine the magnitude of each sample during one interval of time and then to transmit the series of pulses representing that sample during the next or a succeeding interval of time. During this next or a succeeding interval of time, the counting equipment is free to determine the magnitude of the next sample.

When the counter operates upon the binary principle, as in the present invention, and a pulse is transmitted representing the condition of each stage of the counter after having been set in accordance with each sample, each pulse of a code group of pulses represents a certain fraction of the total possible magnitude of the sample. These fractions, when added together, represent the magnitude of the sample. By first determining these quantities and then storing them and later transmitting them, it is possible to transmit in a desired order.

In the exemplary system described hereinafter, pulses representing the smallest fraction are transmitted first, and each succeeding pulse represents twice as great a fraction of the total possible magnitude of each sample as the preceding pulse. By transmitting the pulses in this order, which is equivalent to transmitting digits of a binary number in a reverse order from which they are usually read, it is possible to reconstruct the magnitude of each sample by applying the pulses to a simple network comprising a condenser and a resistance connected in parallel and having a time constant related to the pulsing speed. In the exemplary system embodying the present invention, the time constant of the condenser and resistance combination is so chosen that the potential across the condenser changes by one-half during each pulse interval.

While the novel features of this invention, which are believed to be characteristic thereof, are set forth with particularity in the claims appended hereto, the invention itself, both as to its organization and method of operation together with other objects and features thereof, may be more readily understood from the following description of an exemplary system embodying the invention when read with reference to the accompanying drawings in which:

Fig. 2 shows the manner in which Figs. 3, 4 and 5 are positioned adjacent one another;

Figures 2, 5, 6:
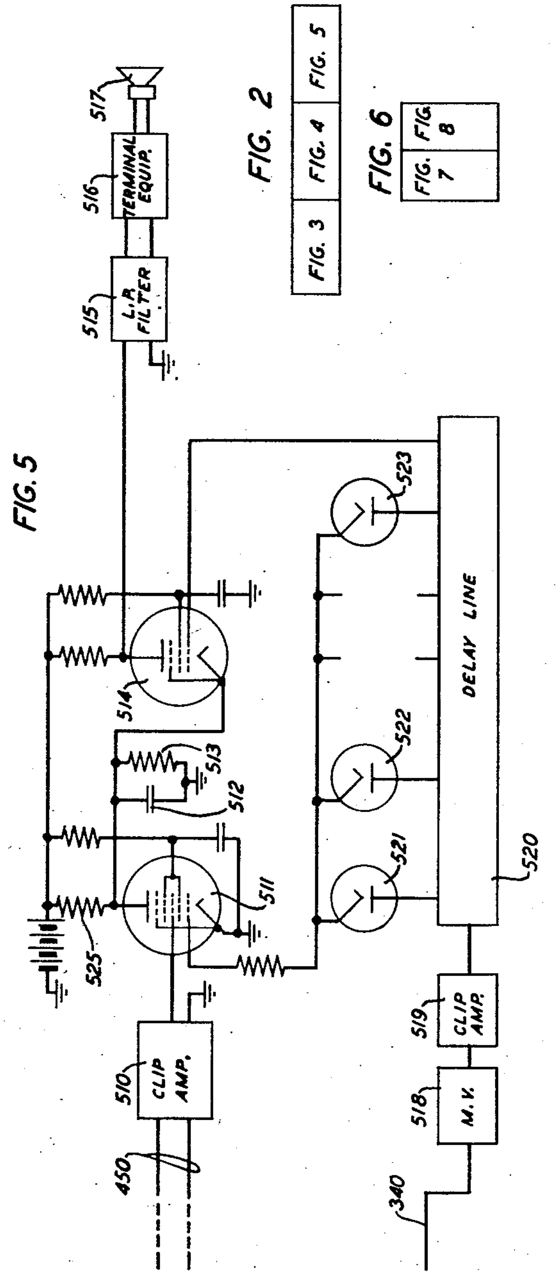
Figure 3:
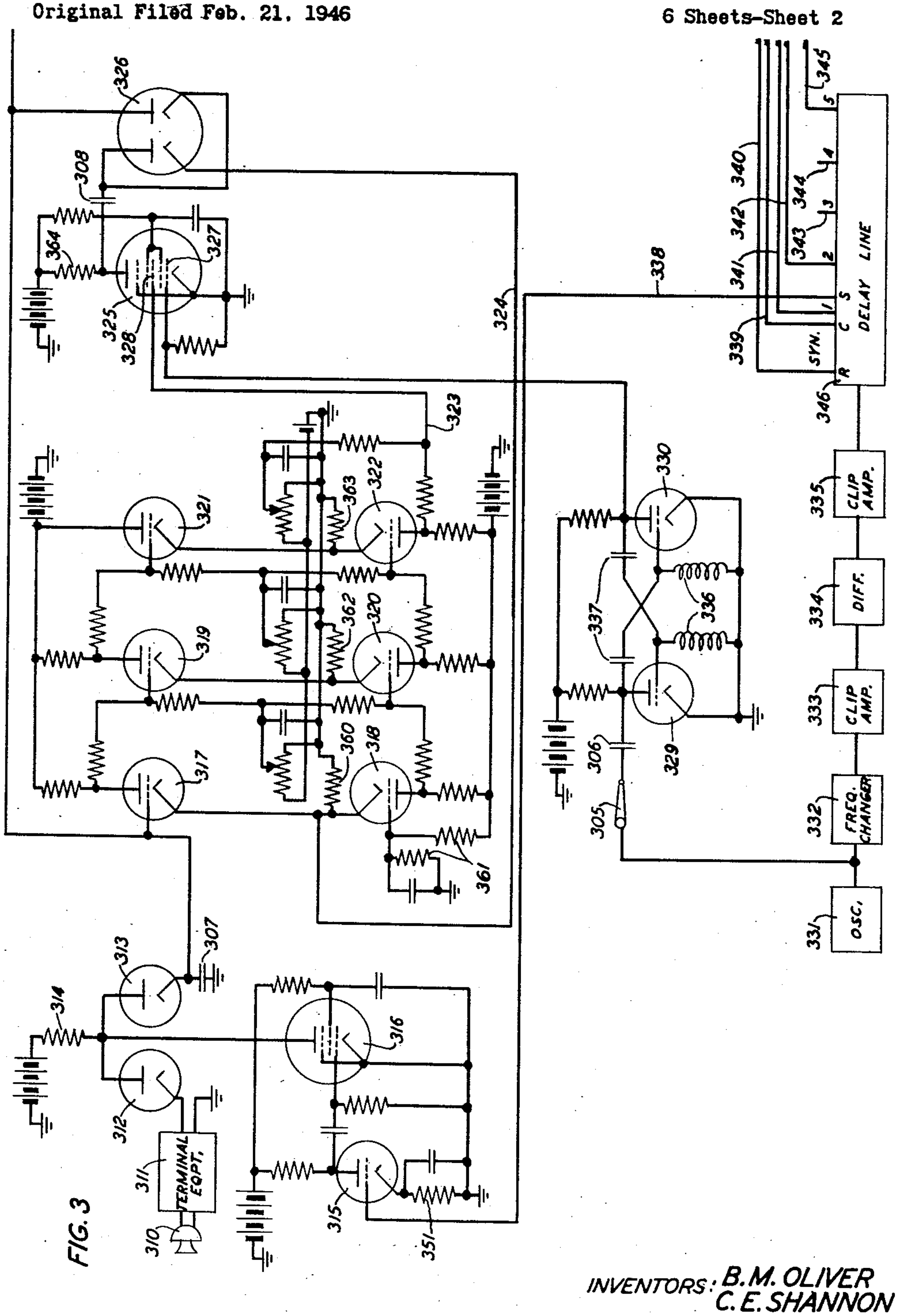
Figure 4:
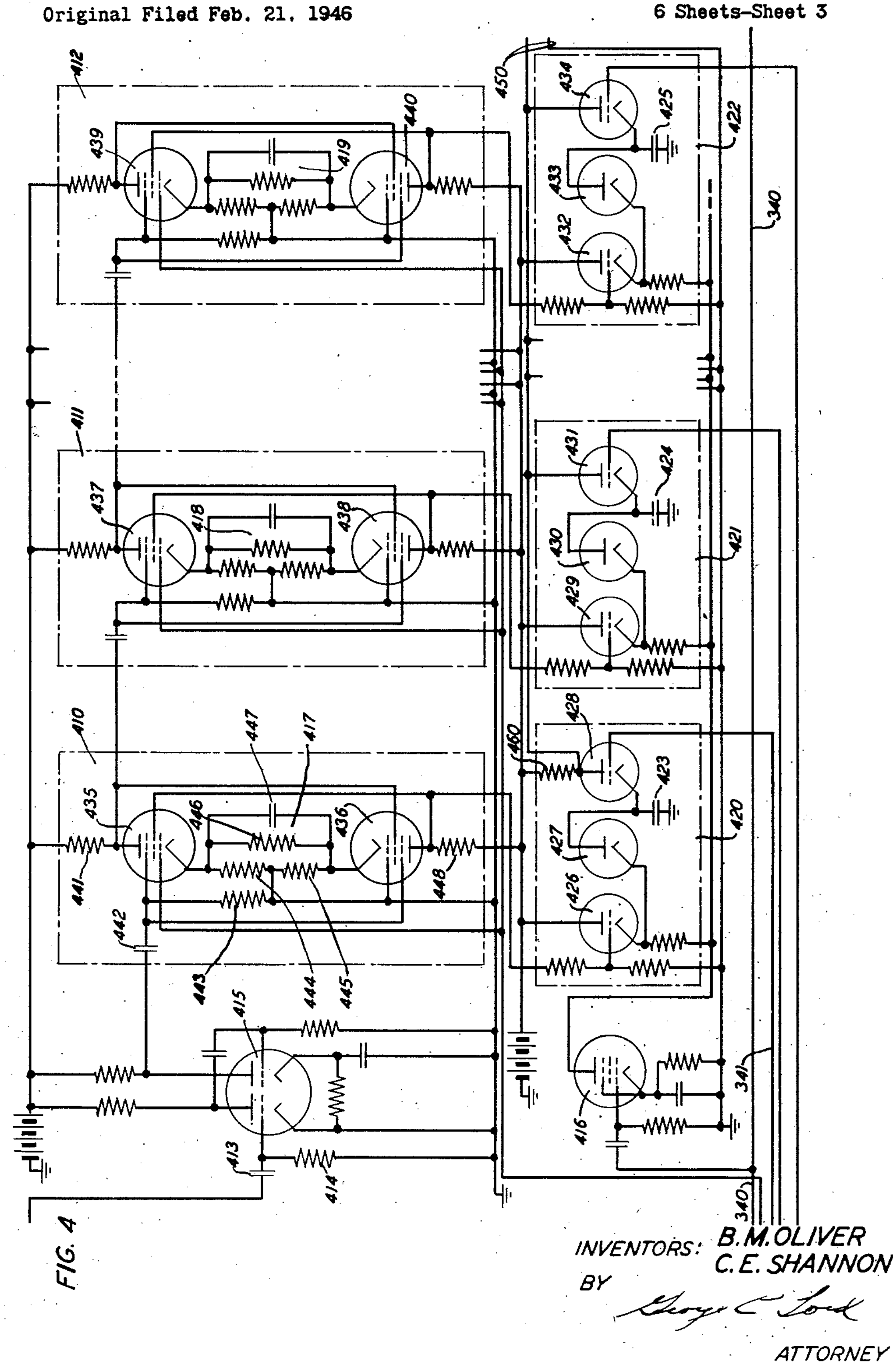
Figure 7:
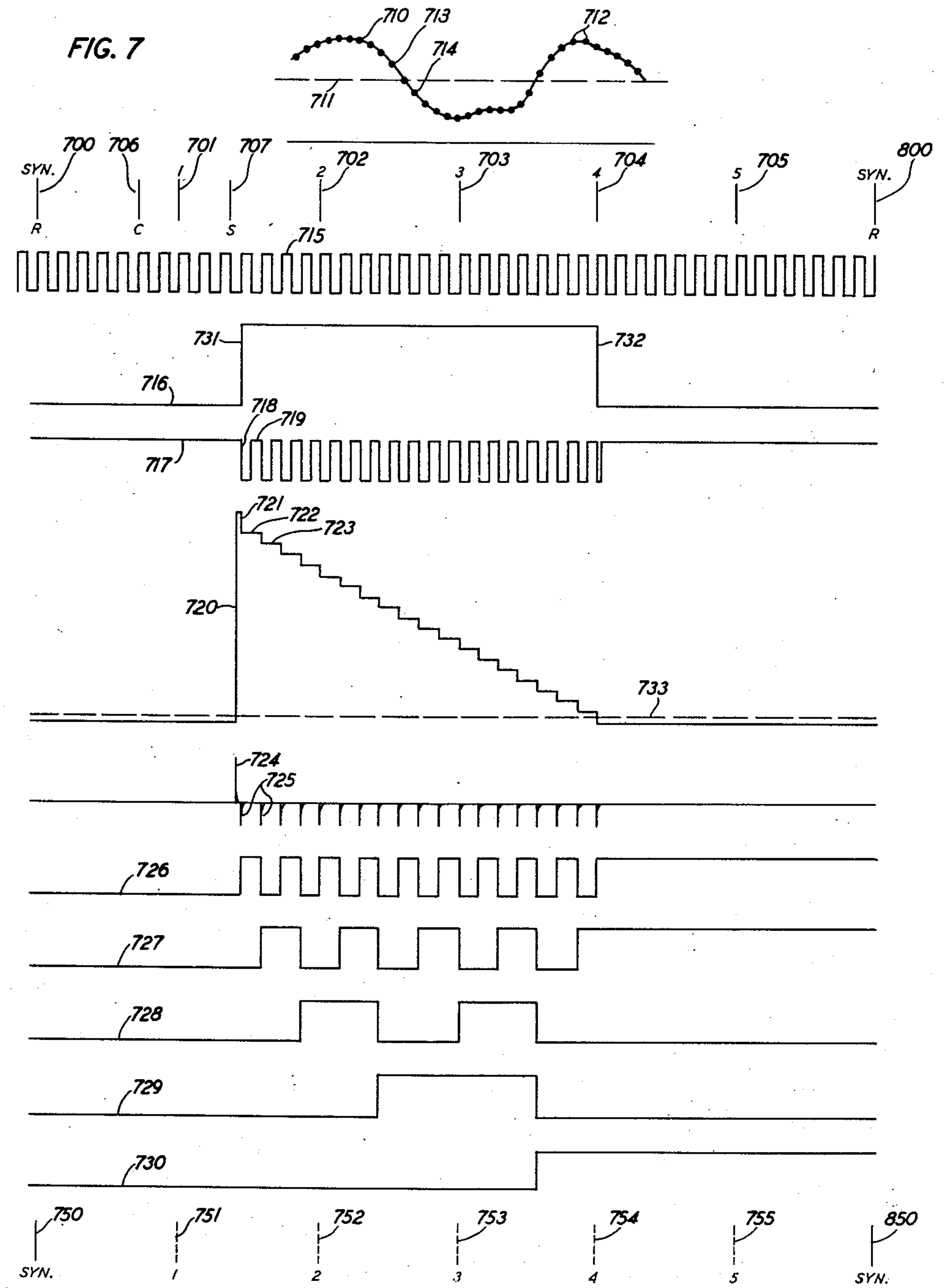
Figure 8:
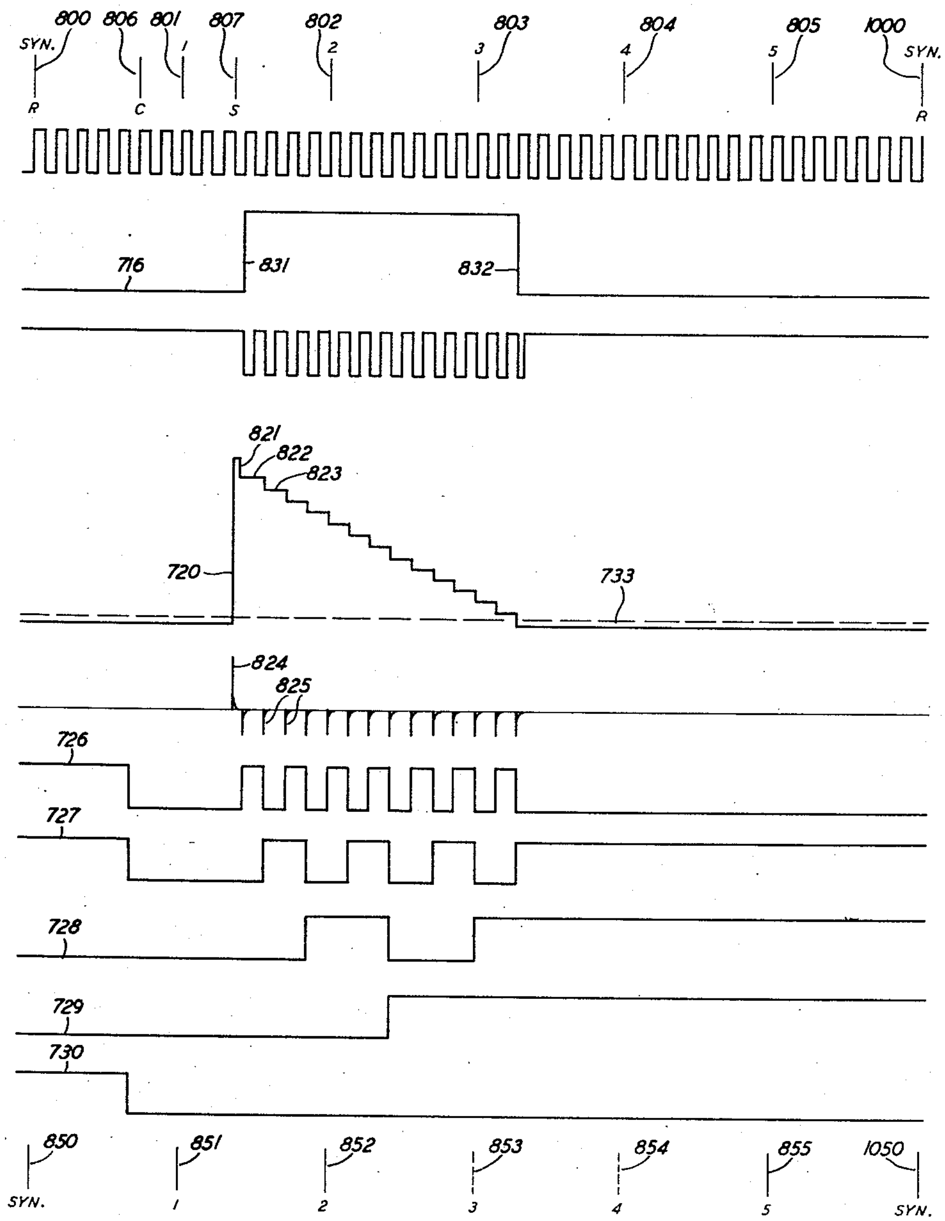
Figure 9:
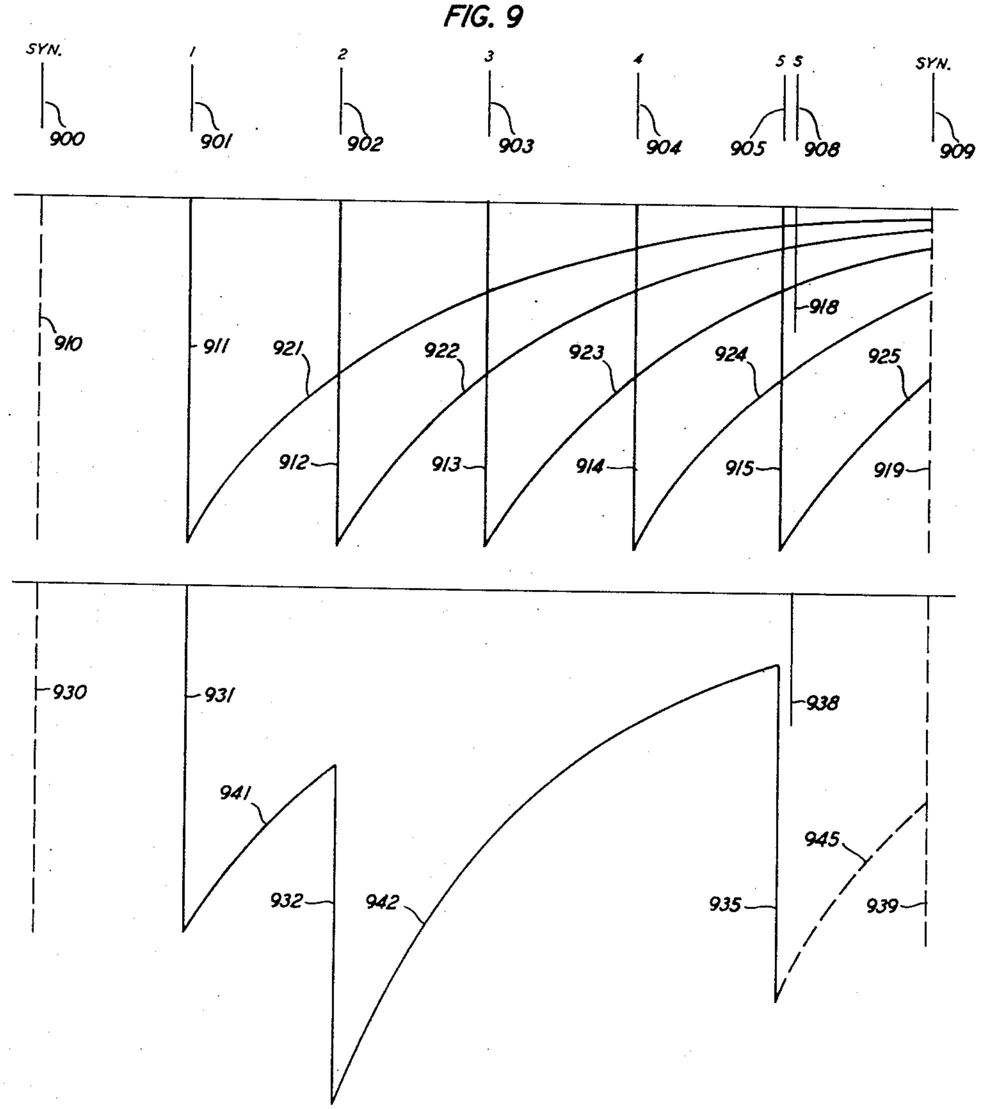

Figs. 3, 4 and 5 when positioned in accordance with Fig. 2, show in detail, the equipment and circuits of each of the elements of an exemplary system, and the manner in which they are connected together;

Fig. 6 shows the manner in which Figs. 7 and 8 are positioned adjacent one another; and Figs. 7, 8 and 9 show in graphic form the wave form of voltages at various places in the system as will be described hereinafter.

Figure 1:
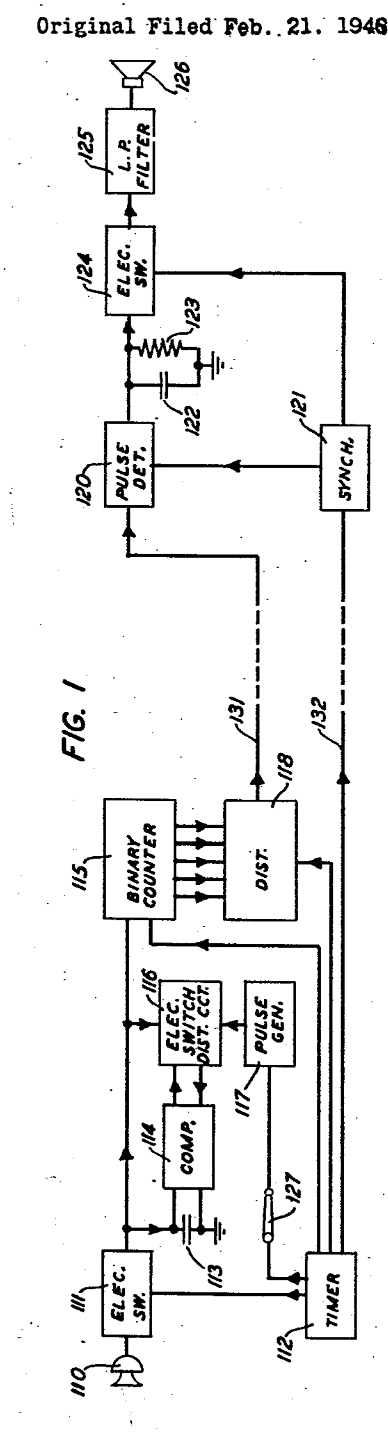
Fig. 1 shows in diagrammatic form the various elements and functions performed thereby and the manner in which these elements cooperate to form an exemplary communication system embodying the present invention.

Fig. 1 shows in schematic form the various circuit elements and apparatus, and the manner in which they cooperate to form an exemplary system embodying the present invention. In Fig. 1, a single one-way communication channel is disclosed for transmitting signals from a source 110 to a receiving device 126. It will be obvious to persons skilled in the art that additional channels may be provided between the two stations or positions and in particular another channel in the reverse direction may be provided so that a two-way communication path will extend between the two points. To accomplish this, it is necessary to duplicate the equipment shown in Fig. 1 by providing transmitting equipment adjacent the receiving device 126 and receiving equipment adjacent the transmitting device 110. If desired, the two one-way systems operating in opposite directions may be combined by means of any of the usual hybrid coil circuits or equivalent equipment.

The source of signals 110 is illustrated in Fig. 1, as a microphone responsive to speech, music or other sound waves. It will be obvious to persons skilled in the art that any suitable type of microphone or other signal source may be employed. Typical devices which may replace the microphone 110 include picture transmission systems, telegraphic transmitters, vibration pick-ups, photoelectric devices, piezoelectric devices, one or more channels from a multichannel voice frequency telegraph system, etc.

The source of signals 110 is connected through any suitable interconnecting and terminal equipment to an electronic switch 111. The electronic switch 111 is controlled by timer 112 so that it will operatively connect condenser 113 to source 110 or at least charge condenser 113 to a potential determined by the amplitude of the complex wave at predetermined intervals of time.

Condenser 113 is connected to a comparison circuit 114 which controls an electronic switch and discharge circuit 116. By the means of pulse generator 117, electronic switch and discharge circuit 116 and the comparing circuit 114, the condenser 113 is discharged in a plurality of steps of substantially uniform magnitude. The upper terminal of condenser 113 is also connected to a binary counter 115 which counts the number of steps required to discharge condenser 113 to a predetermined reference or zero level.

Thereafter the setting of the binary counter 115 is transferred to storage circuits and equipment associated with the distributor 118. The distributor 118 then causes a plurality of pulses to be transmitted over the transmission conductor 131. Operation of the electronic switch 111, binary counter 115 and distributor 118 are under control of the timer circuit 112 to insure that each of these devices performs its function in proper sequence. As shown in Fig. 1 the switch 127 is provided for synchronizing the pulse generator 117 with timer 112. While synchronous operation of the pulse generator 117 is not essential to the successful operation of this system and may be undesirable at times, at other times it will be desirable to operate the pulse generator 117 in synchronism with timer 112. In order to make the system flexible and suitable for use under both such circumstances, switch 127 has been provided so that when this switch is closed the pulse generator 117 and the timer 112 are operated in definite time relation one with the other. However, when switch 127 is open, these two devices do not have to operate in definite time relation one with the other. Under these circumstances, the only requirement is that sufficient time be provided for the various elements of the system to perform their required functions.

As will appear hereinafter, the timer 112 controls the operation of the electronic switch 111, the distributor 118 and binary counter 115 and also pulse generator 117, when switch 127 is closed, in such a way that complex wave is first sampled and then the magnitude of the charge on condenser 113 is registered by the binary counter 115 through the action of the comparing circuit 114, electronic switch 116 and pulse generator 117. Thereafter the setting of the binary counter is transferred to the distributor circuit 118 whereupon the binary counter is reset and another sample of the complex wave obtained and the process of determining the magnitude is repeated for this sample. During the time the second sample is being obtained and its magnitude determined, pulses representing the magnitude of the first sample are transmitted by the distributor 118. Thus a maximum time is provided for determining the magnitude of the samples and also for the transmission of pulses representing these samples. In other words, during one cycle of operation of the distributor, pulses representing one sample are transmitted and during this same cycle of the transmitter the magnitude of the succeeding sample is being determined so that pulses representing the second sample may be immediately transmitted following the pulses representing the first sample.

As shown in Fig. 1, the transmission conductor 131 extends from the distributor 118 to pulse detector circuit 120 at the distant end of the system. It will be readily understood by persons skilled in the art that the line 131 is intended to represent any and all suitable types of communication paths or combinations thereof, including open wire lines, cable conductors, twisted pairs, channels of carrier systems, coaxial lines, wave guides, radio channels and time division multiplex channels. Furthermore, this transmission path may also include suitable amplifiers, filters, equalizing networks, gain control networks and circuits, phase control circuits and networks, repeaters, repeater stations, as well as signal operated switching devices which control the direction of transmission. In addition, when the transmission path is over a coaxial cable the transmission system may include any or all of the features disclosed, or disclosed in United States Patents 2,343,568 granted to L. W. Morrison, Jr., on March 7, 1940, 2,212,240 granted August 20, 1940, to A. Land et al. and 2,095,361 granted October 12, 1937 to Green. These features may also be included in other types of transmission systems when desirable. Transmission channel 131 may also include regenerative repeaters as well as other types of repeating and terminal equipment. The terminal equipment associated with each of the respective transmission paths is suitable for terminating and interconnecting the various types of lines and paths so that they will each cooperate with the adjacent sections to form a transmission channel between the two stations. Inasmuch as the various types of transmission systems are well known and well understood by persons skilled in the art, and inasmuch as they operate in their usual manner in cooperation with the other elements of the exemplary system described herein, detailed descriptions of these systems and their modes of operation would only tend to obscure the present invention rather than clarify it. Consequently, such detailed description is not being repeated.

In addition to the transmission channel 131 extending between the two stations, a second channel 132 is shown in Fig. 1. This channel is employed for transmission of synchronizing pulses of the timer 112 to the synchronizing circuit 121. Transmission channel 132 may be of any suitable type and may include any of the types of channels or combinations thereof referred to above with reference to channel 131. A separate synchronizing channel 132 has been shown in the exemplary system embodying the present invention in order to simplify the disclosure thereof. It will be readily understood by persons skilled in the art that synchronizing channel 132 may be one of the channels of the transmission path 131. In addition, as is well understood, the signaling pulses themselves may be employed to control the synchronizing equipment 121, in which case, a separate transmission path will not be required. As will be described hereafter, a synchronizing pulse is transmitted for each code group of pulses representing each of the samples. The synchronizing pulses will frequently be transmitted over the transmission channel 131 between the various groups of signaling pulses. Consequently, as described hereinafter, the synchronizing pulses are generated and transmitted in such a time relationship with the pulse code groups, as to readily lend themselves to transmission over the transmission channel 131 instead of over channel 132 as actually shown in the drawings.

The signaling pulses are received at the receiving station from channel 131 by the pulse detector 120 which receives the pulses and then reforms the pulses both in wave form or shape and time of occurrence under control of a selected portion of the received pulses. The equipment at the receiving end may also include pulse shaping circuits, limiting amplifiers, and other similar devices. The output of the pulse detector 120 is in the form of pulses of current of predetermined uniform amplitude and duration. In other words, each output pulse from the pulse detector comprises the same predetermined quantity or charge of electricity which is substantially independent of the potential of the load or output circuit connected to the output circuit of the pulse detector. Synchronizing equipment 121 is controlled by synchronizing pulses received over channel 132 and is connected to the pulse detector circuit 120 to control this circuit in shaping the pulses, as well as to select the most desirable portion of the received pulse. The output circuit of the pulse detector 120 is connected to condenser 122 and resistor 123 in parallel. The network comprising resistor 123 and condenser 122 is employed to decode the pulse code groups applied to it and functions so that at particular instants of time the potential across this circuit is proportional to the magnitude of the samples of the original complex wave as represented by the code groups of pulses transmitted over transmission path 131.

Electronic switch 124 is connected to the network comprising condenser 122 and resistance 123 so that it will in effect, sample the voltage across this network at that instant of time when the voltage across the network is substantially the same or at least linearly related to the magnitude of the samples of the complex wave at the transmitting station. The output of the electronic switch 124 is thus a series of pulses of varying magnitude, each pulse having a magnitude which corresponds to the magnitude of a sample of the complex wave applied to the transmitting equipment. These pulses of varying magnitude are then transmitted through the low-pass filter 125 whereby they cause a complex wave similar in form to the complex wave at the transmitting station to be synthesized. The output of the low-pass filter 125 is then connected through any suitable terminal equipment, as will be described hereinafter, to the receiver 126. As shown in Fig. 1, receiver 126 is represented as a telephone or loud speaker. It will be readily understood by persons skilled in the art that receiver 126 will be of any type suitable for receiving or recording signals of the type transmitted by the transmitting device 110 at the transmitting station.

In order better to explain the operation of the system disclosed herein, reference will now be made to Figs. 3, 4, and 5 when arranged as shown in Fig. 2 and to Figs. 7, 8 and 9.

Figs. 3 and 4 show detailed circuits and equipment at the transmitting station while Fig. 5 shows detailed circuits and equipment at the receiving station. Figs. 7 and 8 when arranged as shown in Fig. 6 show the wave form of the potential at various points in the circuits at the transmitting station, while Fig. 9 shows the wave form of the potentials at certain points and under certain conditions at the receiving station.

In Fig. 1, 310 is shown as a microphone but is intended to represent any suitable source of signals having a complex wave form and is similar to device 110 shown in Fig. 1 and may include any of the devices mentioned above with reference to 110.

The signal source 310 is connected through the terminal equipment 311 to a sampling circuit comprising tubes 312, 313, 315 and 316 together with their associated equipment.

Terminal equipment 311 may include any suitable type of terminal equipment commonly employed for the transmission of complex waves. In the case of complex waves representing speech as employed in telephone systems, the terminal equipment 311 may include any one or more of the following types of equipment and circuits, including amplifiers, transmission lines, switching equipment of any suitable type such as manually controlled switching equipment at manual central offices, automatic or machine or dial switching equipment such as employed in automatic central offices, a well as phase control apparatus, gain control apparatus, equalizing apparatus, voice control switching apparatus, etc. This terminal equipment may also include toll line facilities and toll line switching equipment. Thus the terminal equipment 311 represents all of the equipment connected between the source of microphone 310 and the exemplary communication system embodying the present invention and set forth in detail herein.

*Timing and control circuits*

Before describing the operation of the individual circuits in detail reference will be made to certain control equipment employed at the transmitting station. This control equipment or at least certain portions thereof may be common to a plurality of channels. Of course, when so desired this control equipment may be provided for each of the individual channels.

As illustrated in Fig. 3 a control oscillator 331 is provided and is connected to a frequency changer 332, limiting or clipping amplifier 333, differentiating circuit 334 and limiting or clipping amplifier 335. The output of oscillator 331 is also connected through switch 305 and condenser 306 to a pair of vacuum tubes 329 and 330, connected in a multivibrator circuit. The oscillator 331, frequency changer 332, the amplifiers 333 and 335 as well as the differentiating circuit 334 may be of any suitable type well known in prior art. They may also form parts of standard frequency systems employed to control any other types of apparatus as well as any other systems of the type set forth herein. Typical oscillators and standard frequency systems suitable for use in combination in the exemplary systems set forth herein employed in the present invention are disclosed in United States Patents 1,788,533, Marrison, January 13, 1933; 1,931,873, Marrison, October 24, 1933; 2,087,326, Marrison, July 20 1937; 2,163,403, Meacham, June 20, 1939, and 2,275,452, Meacham, March 10, 1942. The disclosures of all of the foregoing patents are hereby made a part of the present specification as if fully included herein.

In addition, multivibrator circuits are well known in the art so that any suitable type may be employed for the multivibrator circuit represented by tubes 329 and 330. Typical multivibrator circuits suitable for use in the present system are described in the United States Patents 1,744,935 granted to Van der Pol January 28, 1930, and 2,022,969 granted to Meacham on December 3, 1935, and in an article by Hull and Clapp published in the Proceedings of the Institute of Radio Engineers for February 1929, pages 252 to 271. See also sections 4–9 "Multivibrator" beginning on page 282 of "Ultra-High-Frequency Techniques" by Brainerd, Kochler, Reich and Woodruff.

As will be explained hereinafter it is not essential that the multivibrator circuit be synchronized with the oscillator 331 but under at least certain circumstances it may be desirable to have the multivibrator synchronized. In order to arrange the circuit so that this may or may not be accomplished switch 305 has been provided. When switch 305 is closed the output of the multivibrator circuit is synchronized with the output of the oscillator 331.

In accordance with the exemplary circuit embodying the invention set forth herein, the output of the final amplifier 335 is arranged to supply a positive pulse of very short duration at periodic intervals. The frequency with which the output of the pulse from amplifier 335 is supplied determines the highest frequency component of the complex wave form which will be transmitted over the system. The highest frequency component of the complex wave form will usually be somewhat less than half the frequency of the pulses supplied from amplifier 335. In addition the frequency of the pulse from amplifier 335 should be so related to the multivibrator circuit that a sufficient number of cycles will be obtained from the multivibrator circuit between the pulses from amplifier 335 to insure proper operation of the system. While it is unnecessary to have the number of cycles from the multivibrator circuit limited to the same predetermined and fixed number between the output pulses from amplifier 335 it is nevertheless desirable to do this at times. In the following description therefore, it will be assumed that the positive pulse output from amplifier 335 will be at a rate of approximately 8,000 to 10,000 a second and that the frequency of the multivibrator circuit will be such that approximately 42 cycles will be obtained therefrom between each of the pulses from amplifier 335.

A delay line 346 is connected to the output of amplifier 335. The delay line 346 may be of any suitable type. The delay line or network employs an inductance and capacitance in each section and in general will include a plurality of sections each of which may be in accordance with one or more of the sections of one or more of the types disclosed in United States Patent 1,770,422, granted July 15, 1930, to Nyquist. The delay line 346 should be properly terminated so as to eliminate the reflected wave or reduce it to a very small value so that the reflected pulse will not interfere with the operation of the system.

Delay line 346 is provided with a number of taps as shown in Fig. 3. As is well understood by persons skilled in the art such a delay line with various output taps when supplied with positive pulses described above will cause a positive potential to be applied to or appear upon the various taps in succession at different intervals of time depending upon the position of the tap along the delay line. In other words, as the applied pulse travels down the delay line it appears at each succeeding tap at successively later and later instants.

Figs. 7 and 8 show the times at which the positive pulses appear on the various taps of the delay line. These pulses are each used for various purposes as will be described hereinafter. Line 700, Fig. 7, represents the time at which a positive pulse is applied to lead 340. Line 706 illustrates the time at which a positive pulse appears on conductor 339. Similarly line 701 shows the time in which the positive pulse appears on conductor 341. Line 707 illustrates the time the positive pulse appears on conductor 338. Lines 702, 703, 704 and 705 show the times a positive pulse is applied to the respective conductors 342, 343, 344 and 345. Thereafter, the pulse traveling the delay line 346 is absorbed in the termination of this line. At the time shown by line 800 a second pulse will have been received from the amplifier 335 and appear on conductor 340. Thereafter a second series of pulses will be applied to the conductors 338 to 345 as described above and shown in Fig. 8 by lines 800 through 807.

The curve or broken line 715 shows the output of the multivibrator circuit comprising tubes 329 and 330 to the same time scale as that on which the output pulses from delay line 346 were shown.

It will be readily understood by persons skilled in the art that the lines 700 through 707 and 800 through 807 represent the time position of the various pulses applied to the conductors 338 through 345. These lines however are not intended to accurately represent the wave forms of these pulses. The length and wave forms of these pulses may be varied by means of various circuits as is well understood by persons skilled in the art. Each of these pulses may be transmitted through one or more circuits which will control the duration, magnitude and wave form of the pulses. Inasmuch as circuits of this type are well known in prior art and operate in their usual manner in cooperation with the other elements of the system set forth, the details of such circuits have not been set forth or described. However, for more detailed description of said circuits and their operation reference is made to a book entitled "Ultra-High-Frequency Techniques" by Brainerd, Kochler, Reich and Woodruff first published in 1942 by the Van Nostrand Company, Inc. More particularly reference is made to the single stage limiter shown in Fig. 8–6 on page 282 and described on page 283. Reference is also made to chapter 4 of this book entitled "Trigger circuits, pulse sharpening circuits, oscillators."

For more detailed description of the limiting and clipping amplifiers 333, 335 and differentiating circuit 334 reference is also made to the above-identified section of the above-identified book. All of these descriptions are hereby made a part of the present specification as if fully included herein.

*Sampling circuit*

Assume now that some complex wave form such as illustrated by line 710 in Fig. 7 is applied from the terminal equipment 311 to the cathode of tube 312. Also assume that the system is arranged to sample the instantaneous amplitude of this complex wave form at the instant of time represented by the large dots 712, 713 and 714. Furthermore, assume that the operation of the system in response to the sampling of the amplitude curve 710 at the instant of time represented by dot 713 is illustrated in Fig. 7 in that the instant of time represented by dot 714 in the operation of the system is illustrated by the wave forms shown in Fig. 8. As shown in Fig. 7 the complex wave form is biased so that it will vary about a mean positive value represented by the dashed line 711, Fig. 7, and its minimum value will be slightly positive. In other words, the complex wave will always be positive as applied to the cathode of tube 312. By way of illustration curve point 713 was chosen to be slightly above the mean line 711 and point 714 slightly below this line.

Returning now to the operation of the sampling circuit comprising tubes 312, 313, 315 and 316 it will be noted that the grid of tube 315 is connected to the lead 338 to which the sampling pulse is applied from delay line 346 at the time represented by line 707. Prior to the application of the sampling pulse to the grid of tube 315 only a small current flows in the output circuit of tube 315 due to the bias potentials applied thereto by the cathode resistor 351 as is well understood by persons skilled in the art. Also in the absence of a bias potential a large output current flows in the anode circuit of tube 316 through the anode resistor 314. As a result the plates of the diodes 312 and 313 are maintained at a potential less than their cathodes, the voltage drop in the space path of tube 316 being lower than the minimum value of the biased signal wave 710. Consequently, substantially no current flows through these diodes under these conditions and the condenser 307 will have a small minimum positive charge.

However, upon the application of the positive pulse 707 to conductor 338 and thus to the grid of tube 315 a pulse of current of relatively large magnitude flows in the output circuit of tube 315. Due to the coupling between the tubes 315 and 316 a negative pulse will be applied to the grid of tube 316 as is well understood by persons skilled in the art. Thus the tube 315 serves to change the positive pulse applied to its grid to a negative pulse which is applied to the control element of tube 316.

When this negative pulse is applied to the control element of tube 316 the anode current flowing through this tube will decrease and thus the potential of the anodes of the diodes 312 and 313 will rise to a higher positive potential because the voltage drop across the anode resistor 314 will fall as the anode current of tube 316 falls.

As the anode potential of tube 313 swings positive tube 313 will start to pass current and charge the upper terminal of condenser 307 to a positive potential. This action will take place in accordance with the well-known behavior of resistance-capacitance circuits, so that the charge on condenser 307 and the voltage on the anode of tube 313 are interdependent, and that the voltage to which the condenser 307 can charge is dependent upon the voltage available at the anode of tube 313.

Neglecting for the moment the action of tube 312, when the tube 316 is cut off the voltage of the anode of tube 313 will rise sufficiently to cause the flow of current through that tube and charge condenser 307 commencing with a large current through resistor 314, which current decreases exponentially as the charge on the condenser 307 increases and being accompanied by a rise in the voltage of the anode of tube 313. In the absence of any other effect, this action would continue until the condenser 307 and the plate of tube 313 reach substantially the voltage of the battery. However, when the anode of the tube 313 and accordingly the anode of tube 312 reaches a voltage in excess of the instantaneous value of the complex wave applied to the cathode of tube 312 that tube draws current through the resistance 314. The resultant voltage drop will provide a corresponding limit to which the voltage of the anode of tube 313 can rise and accordingly to which the condenser 307 can charge. Since the voltage in resistance 314 due to current through 312 is inversely proportional to the voltage of the complex wave applied to the cathode of that tube, the voltage to which the condenser 307 charges will be directly proportional to the instantaneous voltage of the complex wave.

This action all occurs during the time that the sampling pulse is applied to the grid of tube 315. When the tube 316 again conducts, on the termination of the sampling pulse, the anodes of tubes 312 and 313 again drop to a low positive voltage less than the minimum signal voltage applied to the cathode of tube 312, isolating the condenser 307. Thus a voltage proportional to that of the complex wave is developed on condenser 307 for each sampling pulse and is maintained at that value except for changes brought about by the coding operation which are such as to reduce the condenser voltage to a low value representing the minimum signal voltage prior to the application of the next sampling pulse.

*Step discharge and counting circuits*

The amplifier tubes 317 through 322, inclusive, are arranged to form a differential or limiting amplifier such that, so long as the potential applied to the grid of tube 317 from the upper terminal of condenser 307 remains below a predetermined, fixed or reference value, the output potential applied to lead 323 will be the same low value which remains substantially constant until the input potential applied to the grid of tube 317 exceeds the above-mentioned predetermined reference value. However, when the upper terminal of condenser 307 is charged to a positive potential which is a function of the instantaneous amplitude of the complex wave as described above, the potential of the grid of tube 317 will exceed the predetermined reference value and cause a relatively high positive potential to be applied to the output lead 323. Due to the limiting features of the amplifier comprising tubes 317, 318, 319, 320, 321 and 322, the potential of lead 323 will be maintained at substantially the same high positive value so long as the potential of the upper terminal of condenser 307 and thus the potential of the grid of tube 317 remains above the predetermined reference value mentioned above.

Briefly the limiting amplifier comprising tubes 317 through 322 operates in the following manner. So long as the potential of the grid of tube 317 is maintained at a low value, the tube will pass substantially no anode current. Consequently, the potential of its anode will be relatively high and thus the grid of tube 319 will be at a high positive potential. Consequently, tube 319 will conduct or pass a relatively high anode current, thus reducing its anode potential to a low value. As a result, the grid of tube 321 will also be at a low value so that tube 321 will pass substantially no anode current. Each of the tubes 317, 319 and 321 has associated with it another tube 318, 320 and 322, respectively, each of which pass anode current during the time its associated tube is cut off, and each of these tubes are cut off when the associated tube passes current. When tube 317 is substantially cut off, substantially no current will flow through the common cathode resistor 360 due to current flowing in tube 317. As a result, the potential of the cathodes of tubes 317 and 318 will tend to become less positive. The potential of the grid of tube 318 is fixed at such a value, by means of resistors 361, that tube 318 will conduct current under these conditions. Thus the potential of the anode of tube 318 will be at a low value at this time and the potential applied to the grid of tube 320 will also be a low value so that substantially no anode current will flow through this tube. Consequently the anode of this tube and grid of tube 322 will be at a relatively high positive potential, which in turn, causes tube 322 to pass high anode current. As a result, the potential of the anode of tube 322 will be maintained at a low potential at this time. Consequently the potential of lead 322 and of the grid 328 of tube 325 will be maintained at a low value.

Upon the application of a positive potential to the grid of tube 317, the current conditions of the respective tubes 317 through 322 will be reversed. Consequently a relatively high positive potential will be applied to lead 323 and thus to grid 328 of tube 325. The common cathode resistors 360, 362 and 363 for each of the respective pairs of tubes, tend to aid the operation described above, so that the response of the amplifier will be rapid and certain and the condition of the tubes of each pair will be maintained substantially opposite.

So long as the potential applied to the grid 328 of tube 325 is of the relatively low value described above, tube 325 will pass substantially no current and will not repeat the square pulses from the multivibrator circuit of tubes 329 and 330. Instead, the anode of tube 325 will be at a relatively high positive potential.

With the anode of tube 325 at a relatively high positive potential, the left-hand terminal of condenser 308 will also be a relatively high positive potential. As a result, sufficient current will flow through the left-hand section of tube 326 to charge condenser 308, so that its left-hand terminal will be at a relatively high positive potential while its right-hand terminal will be at substantially the potential of the cathodes of tubes 317 and 318, so long as the charge on the upper terminal of condenser 307 is below the reference value mentioned above.

When a positive charge, representing the magnitude of the complex wave at the time represented by the dot 713, is stored on condenser 307 the potential of its upper terminal rises to a positive value above the reference value referred to above and the potential applied to lead 323 and thus to grid 328 rises to a higher positive value as described above, causing tube 325 to operate as a normal amplifier tube. Therefore the next time the output of the multivibrator circuit comprising tubes 329 and 330 rises to a positive value, this pulse will be repeated by tube 325 and cause a relatively large anode current to flow through tube 325, and thus through resistor 364 causing a big potential drop across this resistor. As a result both terminals of condenser 308 will be lowered in potential until conduction is established in the right-hand diode of tube 326, and then condenser 308 will discharge through the right-hand section of tube 326 and tend to neutralize a small portion of the charge on the upper terminal of condenser 307, thus reducing the potential of the upper terminal of condenser 307 by a small amount.

When the output of the multivibrator circuit again becomes negative, tube 325 will cease to conduct current so that the potential of the left-hand terminal of condenser 308 will again rise to a relatively high positive potential and thus cause this condenser to be charged through the left-hand section of tube 326 to such a value that the right-hand terminal of condenser 308 will have substantially the same potential as the cathodes of the tubes 318 and 317 and the left-hand terminal of this condenser will have substantially the same potential as the anode of tube 325.

Upon the next positive pulse from the multivibrator, the left-hand terminal of condenser 308 will again fall to a relatively low value and cause condenser 308 to discharge through condenser 307 and remove a second small portion of the charge from the condenser 307. The above action is then repeated a number of times. For each cycle of output of the multivibrator circuit, the charge on the upper terminal of condenser 307 is reduced by a small amount. This process is repeated until the charge upon the upper terminal of condenser 307 is reduced below the predetermined reference value referred to above, at which time the potential applied to lead 323 and thus to the grid of tube 328, falls to a relatively low value and thus blocks tube 325. Thereafter the circuits remain in this condition until another sample is stored on condenser 307.

The foregoing operation of the circuits may be more readily understood by reference to Figs. 7, 8 which show the wave forms of the potentials or currents at various places in the system. As pointed out above, the line 707 represents the time the sampling pulse is applied to the grid of tube 315. Upon the application of this pulse to the grid of tube 315, the upper terminal of condenser 307 is charged positively to a value which is proportional to or a function of the instantaneous amplitude of the input signaling wave at that time. Curve 720 of Fig. 7 shows the rise in potential of the upper terminal of condenser 307 at this time. It should be noted that the potential of the upper terminal of condenser 307 rises above the reference potential indicated by the dash line 733 at this time. The dash line 733 represents the reference potential for the grid of tube 317 and for tube 318 as pointed out above. When the potential of the upper terminal of condenser 307, and thus the grid of tube 317, exceeds the potential represented by line 733, tube 317 starts to conduct current. This current flows through the anode resistance and also through the common cathode resistance 360. The current flowing through cathode resistance 360 tends to raise the potential of the cathode of tube 318 so that the effective grid potential, that is, the potential difference between the grid and cathode, becomes less. In the exemplary embodiment described herein the effective grid potential between the anode and grid of tube 318 will become sufficiently negative to substantially prevent any current from flowing in the anode circuit of tube 318 at this time.

As indicated above, when a positive potential is applied to the upper terminal of condenser 307, a positive potential is also applied to the grid 328 of tube 325 over lead 323. This potential is represented by line 716 which rises abruptly in the portion designated 731.

The graph 715 shows the output potential from the multivibrator circuits comprising tubes 329 and 330. The multivibrator circuit comprising tubes 329 and 330 includes the inductance 336 and condenser 337. The inductances tend to stabilize the period of operation of the circuit. As shown in Figs. 7 and 8, curve 715, as well as most of the other curves, is shown rectangular in form having square corners and vertical sides and flat tops. Persons skilled in the art will understand that in actual practice the corners will be rounded slightly and that other portions of the curve may depart somewhat from the wave form shown. However, the wave form shown may be approached with any desired degree of accuracy depending upon the amount of amplification provided and other circuit constants selected. Inasmuch as the understanding of the operation of the exemplary system disclosed herein would not be further facilitated by showing exact wave forms, and since these wave forms are well known in the prior art, they have been represented herein by the square wave form shown in the drawing.

The next time the output of the multivibrator becomes positive, following the application of the positive potential to conductor 323, current will flow in the output circuit of tube 325 through the anode resistor 364. The current flowing through resistor 364 will cause a large potential drop to appear across this resistor which in turn reduces the anode potential of tube 325 to a low value. Graph 717 represents the anode potential of tube 325. At the time in question the potential of the anode of tube 325 falls, as illustrated by the portion of curve 717 designated 718.

As pointed out hereinbefore, prior to this time condenser 308 had been charged so that its left-hand terminal was at a relatively high positive potential while its right-hand terminal was at the potential of the cathode of tube 317. When the anode potential of tube 325 falls, as shown in 718, the right-hand section of tube 326 becomes conducting and causes a portion of the charge on condenser 308 to neutralize a portion of the charge on the upper terminal of condenser 307, thus causing the potential of the upper terminal of condenser 307 to decrease by a predetermined amount illustrated by the short line 721 of Fig. 7. When the output of the multivibrator circuit 329, 330 again becomes negative, current will cease to flow in the output circuit of tube 325. Consequently, the plate potential will rise to a high positive value, as indicated at 719. At this time the left-hand diode of tube 326 becomes conducting and causes the right-hand terminal of condenser 308 to again become charged to a high positive potential and the left-hand terminal of this condenser to be charged to substantially the potential of the cathode of tube 317. Thereafter the above cycle of operation is repeated for each cycle of output of the multivibrator circuit comprising tubes 329 and 330. For each cycle of output of this multivibrator a small amount of charge is removed from the upper terminal of condenser 307; hence, its potential decreases in a series of steps as illustrated by curves 720, 721, 722 and 723, Fig. 7. The above-described cycle of operations is repeated until the potential of the upper terminal of condenser 307 falls below the reference potential 733, at which time positive potential is removed from lead 323 and thus from grid 328 of tube 325. It has been assumed that the magnitude of the complex wave at the time of sample 713 is such that it requires nineteen steps to discharge condenser 307 sufficiently to cause the potential of its upper terminal to fall below the reference potential represented by line 733 of Fig. 7. The line 732, Fig. 7, illustrates the removal of the potential applied to the grid 328 of tube 325. As a result, tube 325 ceases to conduct or amplify the output from the multivibrator circuit comprising tubes 329 and 330. Consequently, the potential of the left-hand terminal of condenser 308 will rise to a high positive potential while the right-hand terminal will be held by the left-hand diode of tube 326 at a potential near ground potential. Hereafter the above-described circuits will remain in substantially the same condition until the next sampling pulse such as 807 is applied to the grid of tube 315 at which time the above cycle of operations is again repeated, as illustrated in Fig. 8.

As shown in Figs. 7 and 8, the steps by which the potential of the upper terminal of condenser 307 is reduced are all substantially uniform except perhaps for the first step 721. An arrangement to secure steps of uniform height or magnitude, as shown in Figs. 7 and 8, is very desirable in order to secure improved operation of the circuits because it is desirable that each of the steps, and particularly the later steps, be of sufficient and perhaps of the same magnitude as any of the other steps in order that the proper number of steps will be taken in each case. It is desirable to have the last step sufficiently great to provide ample margins for operating various tubes when the reference potential is crossed.

In order to secure uniform steps, the cathode of the left-hand section of tube 326 is connected to the left-hand terminal of cathode resistor 360. During the time that the positive potential exists upon the upper terminal of condenser 307, tube 318 will be non-conducting as described above. Consequently, the cathode of tube 317 will tend to follow the potential of the upper terminal of condenser 307. As a result, the potential of the left-hand terminal of resistance 360 will also tend to follow the upper terminal of condenser 307. Since the cathode of the left-hand section of tube 326 is connected to the left-hand terminal of resistance 360 over lead 324, the cathode of the left-hand diode 326 will also tend to follow the potential of the upper terminal of condenser 307. As a result, the right-hand terminal of condenser 308 will assume substantially the same potential as the upper terminal of condenser 307. Consequently, substantially the entire voltage change in a negative direction in the output from tube 325 is available to discharge condenser 307 on each step independently of the voltage of condenser 307 so that substantially the same quantity of charge will be removed from condenser 307 for each cycle of operation of the multivibrator circuit, assuming, of course, that all of the cycles of the output of the multivibrator circuit are of equal magnitude as shown on Figs. 7 and 8. In other words, the potential difference between the right-hand terminal of condenser 308 and the upper terminal of condenser 307 at the time these terminals are effectively connected together through the right-hand diode 326 is always substantially the same.

The upper terminal of condenser 307 is also connected through the coupling condenser 413 to the grid of amplifying tube 415. Tube 415 comprises two triode sections which are arranged to amplify and further shape the pulses applied to the grid of the left-hand section. The values of the condenser 413 and resistance 414 are so chosen that the potential applied to the left-hand grid of tube 415 is nearly the derivative of the wave form of the upper terminal of condenser 307. In other words, the time constant of the circuit of the network comprising condenser 413 and resistance 414 is relatively short compared with the duration of the steps of the potential of the upper terminal of condenser 307 and thus with respect to the frequency of the output of the multivibrator comprising tubes 329 and 330. Pulses 724 and 725 of Fig. 7 and 824 and 825 of Fig. 8 represent the derivative of the potential of the upper terminal of condenser 307. The length of these pulses, of course, is determined by the constants of the condenser 413 and resistance 414 as well as the constants of the coupling between the two sections of tube 415. As shown in Fig. 7, a positive pulse 724 is applied to the grid of tube 415 when the upper terminal of condenser 307 is charged to a positive value in proportion to or representative of the instantaneous amplitude of the complex wave being transmitted. Thereafter during each of the discharging steps a negative pulse of short duration is applied to the left-hand grid of tube 415.

The left-hand section of tube 415 is normally unbiased so that a relatively large current flows in its output circuit. The right-hand section is biased so that substantially no current normally flows in its output circuit. As a result, the positive pulse 724 which appears as a negative pulse on the grid of the right-hand section is not repeated by this tube and is therefore not applied to the counting stages 410, 411 and 412, to be described. However, upon the application of a negative potential to the left-hand grid of tube 415, an amplified negative pulse will be applied to the counter sections 410, 411 and 412.

In Fig. 4 three stages or sets of counting tubes have been shown. A person skilled in the art, however, will readily understand that any suitable number of stages or sets of counting tubes may be employed. As shown in Figs. 7 and 8, it is assumed that five stages will be employed. Inasmuch as the additional stages will be exactly like each of the three stages shown, nothing could be gained by expanding the drawings sufficiently to show all of the stages. 410 represents the first stage, 411 a second or intermediate stage and 412 represents the final stage. The counter shown in Fig. 4 is arranged to count in accordance with the so-called binary number system. In other words, each stage of the counter has two stable conditions, one condition representing one digit and the other condition the other digit. Each of the stages will then represent the respective ordinal positions of the digits in the binary number counter. In other words, the counting arrangement employing five stages will be capable of counting thirty-two pulses representing the number counted from one to thirty-two as a binary number. Of course, it will be readily understood that additional stages may be employed if it is desired to count more pulses and thus represent each of the instantaneous amplitudes of the complex wave by a code of more than thirty-two different amplitudes. If it is desired to represent each of the samples by a code of less than thirty-two distinct amplitudes, fewer counter stages will be employed. In general the maximum number of discrete signal amplitudes which may be represented by the coding equipment will be $2^n$ where $n$ is the number of stages in the counter and likewise the number of digits in the binary number and the maximum number of pulses which may be transmitted in a given group.

Each stage of the counter as shown in Fig. 4 is arranged to be reversed in its state of conduction by negative pulses applied to the suppressor grids of the two tubes comprising the stage. Normally the counter is initially conditioned with the upper tubes, namely, 435, 437 and 439 conducting, in a manner to be described hereinafter. With tube 435 conducting, tube 436 will be non-conducting. Consequently, the cathode of tube 435 will be more positive than the cathode of tube 436 and the upper terminal of condenser 447 of network 417 will be positive with respect to the lower terminal of this condenser. Upon the application of a negative pulse to the suppressor grids of tubes 435 and 436, tube 435 will become non-conducting and tube 436 will remain non-conducting. At this time condenser 447 will start to discharge through resistances 446 and 444 and 445. However, the duration of the negative pulse simultaneously applied to the suppressor grids of tubes 435 and 436, is so short that condenser 447 does not become completely discharged. The length of the negative pulse, as simultaneously applied to suppressors in tubes 435 and 436 may be controlled by the time constants of condenser 413 and resistance 414, the coupling network between sections of tube 415 and the time constant of the network comprising condenser 442 and resistance 443.

At the termination of this pulse, as pointed out above, a portion of the previous charge will still be stored in condenser 447. Consequently, the upper terminal of condenser 447 will be more positive than the lower terminal of this condenser. As a result, the cathode of tube 435 will be more positive than the cathode of tube 436. In other words, the control grid as well as the suppressor grid of tube 435 will be more negative with respect to the cathode of this tube than will be the control grid and suppressor of tube 436 with respect to the cathode of tube 436. Consequently, tube 436 will start to conduct first and in conducting reduce the screen potential of tube 435 and thus prevent tube 435 from conducting current at this time. Instead tube 436 will become conducting at the termination of the first pulse. At this time the cathode of tube 436 will grow more positive than the cathode of tube 435. As a result, the lower terminal of condenser 447 will be more positive than the upper terminal of this condenser. Upon the application of the second negative pulse to be counted to the suppressor grids of both tubes 435 and 436, tube 436 will cease to conduct and at the end of the pulse tube 435 will again start to conduct. Thereafter each of the pulses simultaneously applied to the suppressor grids of tubes 435 and 436 will cause the previously conducting tube to become non-conducting and previously non-conducting tube to become conducting. In this way tubes 435 and 436 alternately conduct current in response to the application of negative pulses.

During the time tube 435 is conducting, the anode current for this tube flows through the anode resistance 441 of this tube and produces a potential drop across the resistance 441. As a result, the potential of the anode of tube 435 is at a low value. When tube 435 is non-conducting, substantially no current flows through the anode resistance 441, and as a result, the anode of tube 435 is at a relatively high positive potential. Each time tube 435 changes from a non-conducting condition to a conducting condition the anode potential thereof will fall to a low value. This will cause a negative pulse to be applied to the suppressor grids of both tubes 437 and 438 of the succeeding stage 411. This pulse is applied to the suppressor grids through a condenser and resistance network similar to condenser 442 and resistance 443 having a time constant which is sufficiently short to apply a voltage to the grids of tubes 437 and 438, which is a time derivative of the voltage of the anode of tube 441. Furthermore, this network applies a pulse which is sufficiently short in duration to cooperate with the counter tubes and the network 418 connected between their cathodes in the same manner as described with reference to network 417 of the counter stage 410. In this manner tubes 437 and 438 are changed from the conducting to the non-conducting condition just one-half as often as are tubes 435 and 436. Similarly each of the tubes of each of the succeeding counter stages is changed from a conducting to a non-conducting condition just one-half as often as the corresponding tube of the preceding stage.

Curve 726, Fig. 7, shows the potential condition or wave form of the anode of tube 435. As shown and as described above, the anode potential of this tube is maintained at a relatively low value when the counter is idle. Upon the application of the first negative pulse 725 to the counter, tube 435 becomes non-conducting and hence its anode potential rises to a relatively high value. Upon the application of the next negative pulse 725, the anode potential of tube 435 again falls to a low value as shown by curve 726. The above action of the counter circuit is then repeated for each of the pulses applied thereto. At the end of the nineteenth pulse, as shown in Fig. 7, the upper tube 435 of the first stage 410 of the counter remains non-conducting and hence the potential of the plate of tube 435 is maintained at a relatively high positive value. Curve 727 shows the potential of the anode of the upper tube 437 of the second stage 411 of the counter. Tube 437 remains conducting and thus its anode is maintained at a low value until a negative pulse is applied to the suppressor grids of tubes 437 and 438. This occurs as described above upon the application of the second negative pulse 725 to the first stage 410 of the counter. Thereafter every time a negative pulse is applied to the suppressor grids of tubes 437 and 438 they interchange their conducting conditions. The negative pulse is applied to these grids every time tube 435 changes from a non-conducting condition to a conducting condition, that is, every time the potential of the anode of tube 435 changes from a high positive value to a relatively low value. As shown by curve 727, the potential of the anode of tube 437 changes just one-half as often as the potential of the anode of tube 435. Curve 728 of Fig. 7 shows the times at which the potential of the anode of the third counter stage will change. Likewise curve 729 shows the times at which the potential of the upper tube of the fourth counter stage changes. Curve 730 shows the times at which the potential of the upper tube 439 of the fifth counter stage 412 changes. Thus, the first counter stage counts units, the second stage counts by twos, the third stage by fours, the fourth stage by eights, the fifth stage by sixteens, etc.

At the end of the nineteenth pulse the upper tube of the first and second counter stages will be non-conducting while the upper tubes of the third and fourth counter stages will be conducting and the upper tube of the fifth counter stage will be non-conducting, representing the number 1+2+0+0+16=19. As shown in Fig. 7 in accordance with the assumed conditions, only nineteen pulses will be applied to the counter system. As a result, the counter tubes will remain in the condition described above at the end of the nineteenth pulse until reset in the manner described hereinafter.

*Storage and transmission of pulses*

The circuits and tubes remain in the conditions described above until a second synchronizing pulse occurring at a time represented by line 800 is applied to conductor 340 by the control equipment. The synchronizing pulse in addition to being transmitted over line 340 to the distant receiving station is also applied to the control grid of tube 416. Tube 416 is biased so that no current normally flows in its anode circuit. However, upon the application of a positive pulse to the control grid of this tube, the plate current drawn by this tube through whatever load impedance is presented by the rest of the circuit drops the plate potential to a low value. Those of the tubes 426, 429, 432, etc. which have their grids at a high potential as a result of potentials supplied by the respective counter will conduct current and the cathode potentials of these tubes will not drop below their grid potentials. Thus, the diodes (427, 430, 433, etc.) associated with the cathodes of these tubes will not conduct current nor discharge the condenser 423 or 424 or 425, etc.

Those of the tubes 426, 429, 432, etc. which have their grids at a low potential as a result of the potentials supplied from the conducting lower tube of the respective counter stage will not conduct current, their cathodes will fall to the plate potential of tube 416, the associated diodes (427, 430, 433, etc.) will conduct and discharge condenser 423 or 424 or 425 to this potential.

Hence, the charge on the upper terminal of condensers 423, 424, etc. is controlled by the condition of the corresponding stage of the counter circuit.

As assumed above, the lower tubes of the first and second counter stages will be conducting. Consequently the storage condensers 423 and 424 in the first and second storage circuits will be discharged. The lower tube of the third and fourth counter stage will be non-conducting, and as a result, the corresponding storage condensers will not be discharged. The lower tube of the fifth counter stage will be conducting under the circumstances described above and consequently cause the upper terminal of condenser 425 to be discharged upon the application of the registering and synchronizing pulse to the grid of tube 416.

Thereafter the circuits are maintained in the condition described above until a positive pulse is applied to conductor 339 which is illustrated by pulse 806 of Fig. 8. This pulse is transmitted over conductor 339 to the control grids of the upper tubes of each of the counter stages 410 through 412. The pulse applied to the control grids of these upper tubes is sufficient to cause the tubes to start to conduct if they are non-conducting and to maintain them conducting if they are already conducting. The pulse applied to the control grids of the upper tubes of each of the counter stages at this time is sufficiently long to permit the various transients in the other circuits associated with the counter stages to die out, so that the counter stages will be left with the upper tubes all conducting upon the termination of the positive pulse received over lead 339. The counting circuit is then in condition to count the pulses representative of the succeeding sample. A short interval of time later the No. 1 signaling pulse will be transmitted at a time illustrated by lines 801 and 851.

It will be recalled that the upper terminal of condenser 423 of the first storage circuit 420 is discharged. Consequently, at the time of transmission of the first pulse, pulse 801 will be applied to lead 341 which in turn is connected to the grid of transmitting tube 428. The application of the positive pulse to the grid of tube 428 at this time causes a pulse of charging current to flow into the upper terminal of condenser 423 through a common anode resistor 460. As a result, the potential of the anode of tube 428 falls to a low value causing a negative pulse at a time represented by line 851 to be transmitted over the transmission path 450.

A short interval of time later the succeeding sampling pulse 807 will be applied to conductor 338 and to grid of tube 315 which will cause another charge to be stored upon condenser 307 having a magnitude which is in proportion to or controlled by the amplitude of the complex wave at this time in the manner described above. Thereafter the operation of the discharging and counting circuits is initiated and these circuits function as described above to determine the magnitude of the charge upon the upper terminal of condenser 307.

A short interval of time later a positive pulse is applied to lead 342. Such a pulse is represented by line 802 of Fig. 8. Under the assumed conditions, the condenser 424 of the second storage circuit 421 will also be discharged. Consequently, upon the application of the positive pulse to the grid of tube 431 from lead 342, the second pulse illustrated by line 852 is transmitted over the transmission conductor 450 and condenser 424 will be charged.

As pointed out above the storage condensers in the third and fourth storage circuits (not shown in Fig. 4) will not be discharged. Consequently, when the time pulses 803 and 804 are applied to the respective leads 343 and 344 no pulse will be transmitted over the transmission conductor or signaling channel 450. However, the upper terminal of condenser 425 was previously discharged as pointed out above. Consequently, when pulse 805 is applied to conductor 345, a signaling pulse 855 will be transmitted over the transmission path 450.

The signaling pulses 851, 852 and 855 therefore represent the amplitude of the complex wave at the first sampling time described above and shown at 713, Fig. 7. It should also be noted that considering the pulses as representative of the digits of a binary number, the digit or pulse of lowest denomination (i. e., units) is transmitted first and then each digit or pulse of the next highest denomination (i. e., twos) is transmitted. It should also be noted that each one of the pulses represents a predetermined fraction of the maximum possible amplitude of each of the samples of the complex wave. For example, in the exemplary system described herein, the last or fifth pulse transmitted represents half of the maximum possible amplitude or sixteen units of each sample. In other words, if the No. 5 pulse is transmitted, the sample represented thereby is greater than (or equal to) half of the maximum possible amplitude. If no pulse is transmitted at this time the sample is less than half of the maximum possible amplitude. Likewise, each of the other pulses represents a successively smaller and smaller fraction of the maximum possible amplitude of the respective pulses. In other words, the No. 4 pulse will represent one-quarter or eight units of the sample if transmitted while the No. 3 pulse will represent one-eighth or four units, the No. 2 pulse one-sixteenth or two units and the No. 1 pulse one-thirty-second or one unit of the maximum possible amplitude of the sample. Thus, each of the pulses, if transmitted, represents an increasing fraction of the maximum possible magnitude of the sample and the weighted sum of the pulses of each discrete code group represents the magnitude of the sample.

As shown in the drawing and described above, the connections between the delay line 346, the storage condensers and the stages of the counter, and the transmitting tubes are such that the pulses representing the units digit are transmitted first, followed by pulses representing the digits of each successively greater denominational order of the number.

It should also be noted that the pulses representing the sample obtained at 713 and its magnitude determined in the manner shown by the curves of Fig. 7 is represented by the pulses 851 to 855, inclusive as shown in Fig. 8. At the time the pulses represented by sample 713 are being transmitted the magnitude of the sample 714 is being determined by the discharging and counting circuits as described above. The curves showing the functions of the discharging and counting circuits this time are also shown in Fig. 8. Pulses representing the sample 714 will, however, be transmitted during the next interval of time during which the magnitude of the succeeding sample will be determined. In other words, during the time pulses representing the magnitude of one sample are being transmitted, the next sample is being taken and its magnitude determined so that pulses representing this succeeding sample may be transmitted immediately following the pulses representing the preceding sample.

It should also be noted that the synchronizing pulses 750, 850 and 1050 are transmitted between each group of pulses representing a sample of the complex wave. These synchronizing pulses are employed to synchronize the receiving apparatus so that the proper groups of pulses will be combined to reconstruct a complex wave form similar to the wave form sample at the transmitting station. As indicated above, the synchronizing pulses are shown to be transmitted over a separate conductor 340 in Figs. 4 and 5. However, persons skilled in the art will readily understand that arrangements may be employed for transmitting synchronizing pulses over the main signaling channel.

*Repeater and receiving station*

Fig. 5 shows the apparatus located at a receiving station in which permutation code groups of pulses each group of which represents the instantaneous amplitude of the complex wave at a specified interval of time are decoded and the complex wave synthesized or reconstructed.

The synchronizing pulses received over conductor or transmission path 340 are employed to control the frequency of an oscillator or multivibrator 518. The output of the multivibrator 518 passes through a limiting and pulse-shaping amplifier 519. The output of the amplifier 519 comprises positive pulses similar to the synchronizing pulses obtained from amplifier 335 at the transmitting station. The pulses obtained from amplifier 519 are transmitted through delay line 520. The delay line 520 may be similar to the delay line 346 at the transmitting station and should be capable of producing delays of similar duration.

The signaling pulses received over the transmission path 450 are first amplified and limited or otherwise shaped by an amplifier and associated equipment designated 510, Fig. 5. Either amplifier 510 or amplifier 519 or both of these amplifiers may also contain delay equipment for properly phasing or timing various pulses received over the respective transmission paths. The output of amplifier 510 is connected to one of the grids of a multigrid tube 511.

As indicated above, delay line 520 is provided with a plurality of output leads. A positive pulse is applied to each of these leads in succession at successively greater delay intervals. The delay interval between the application of a pulse to successive leads corresponds to the time interval between each of the received pulses. An isolating diode such as 521, 522 and 523 is connected in series with each of these leads. These tubes are connected so as to pass the positive pulses applied to them. However, when no pulses are applied to these tubes, they have a high impedance so that the delay line is not effectively short-circuited or its operation otherwise interfered with. The cathodes of these tubes are connected to another grid of tube 511.

Line 900 of Fig. 9 represents a synchronizing pulse as received over conductor 340. Lines 901 through 905, inclusive, represent the successive pulses applied through the isolating tubes 521 through 523 to a grid of tube 511. Only three tubes, 521, 522 and 523, are shown in Fig. 5, but it is to be understood that a tube similar to these tubes is provided for each one of the pulses of the code groups of pulses. In other words, in the exemplary embodiment described therein five tubes will be employed. If it is desired to represent each sample by six or seven pulses instead of five as described herein, six or seven tubes similar to tubes 521 through 523 will be employed.

Tube 511 is normally biased so that current can flow in its anode or output circuit only when a positive potential or positive pulse is simultaneously applied to both of the grids referred to above. At all other times substantially no current flows in the output circuit of this tube.

A resistance and condenser network comprising resistance 513 and condenser 512 is connected in the output circuit of tube 511. The time constant of this circuit together with the anode resistance 525 is such that the charge upon the condenser 512 and thus the voltage or potential across the network changes by one-half its previous value during the time interval between two pulses from the delay line 520. If the stored or displaced energy is considered instead of the voltage or charge the rate of return to normal is twice as great, i. e., the energy changes so that the change from normal at the end of a single pulse interval is one-quarter of the value that it was at the beginning of the interval.

Each time tube 511 simultaneously receives a signaling pulse and a pulse from the delay line 520, it will remove the same predetermined quantity of charge from the upper terminal of condenser 512. In other words, the same total charge is removed from the condenser 512 by each of the signaling pulses received over the signaling conductor 450 and transmitted through the amplifier 510. The amount of charge removed from this condenser by each signaling pulse will, of course, control or determine the gain or amplitude of the output of the decoding equipment at the receiving station.

Thereafter, the condenser will start to charge in accordance with the well-known exponential charging law. As pointed out above during the first pulse interval the condenser will have charged up to a value such that one-half the charge removed by the previous pulse has been replaced. This is illustrated in Fig. 9. Line 911 represents the discharge of the upper terminal of condenser 512 in response to the reception of a current pulse during the first pulse interval after the reception of a synchronizing pulse 900.

As explained above the synchronizing pulse 900 is transmitted over and received from line 340 and applied to the delay line 520. Pulses from the delay line 520 are than applied to the inner control grid of tube 511 at the time of the No. 1 pulse illustrated by line 901, Fig. 9. If a signaling pulse is received over path 450 at this time and is applied to the other control grid of tube 511, current will flow in the output circuit of tube 511 and cause the upper terminal of condenser 512 to be discharged as illustrated by line 911, Fig. 9. At the completion of the application of each pulse to tube 511, the tube will become non-conducting and present a high impedance to the network comprising condenser 512 and resistances 513 and 525. Consequently, the tube will thereafter not materially affect the potential of the upper terminal of condenser 512 unless and until another pair of pulses is simultaneously applied to the grids of tube 511.

In the meantime, however, condenser 512 starts to recharge. As pointed out above, the time constant of the recharging circuit including resistances 525 and 513 are such that the upper terminal of this condenser is recharged one-half of the amount of charge removed at the time the No. 2 pulse would be received if it were present. At the time the No. 3 pulse will be received if it were present, the upper terminal of this condenser will have become recharged by one-half of the remaining amount. In other words, during the time interval between the second and third pulses it would become recharged an additional quarter of the amount of charge removed by the reception of the No. 1 pulse, or it would still be discharged by one-quarter of the total amount initially removed from the condenser. At the time of the reception of the No. 4 pulse, the condenser would still be discharged by an amount one-eighth of the original discharge and at the time of the fifth pulse it would remain discharged by the amount of one-sixteenth of the amount of charge initially removed from the condenser. The recharging as described above is clearly illustrated by curve 921 assuming, of course, that only the No. 1 pulse has been received during all this time. By the time the next synchronizing pulse is received the condenser would be recharged except for one-thirty-second of the value of the original discharge. If only a No. 2 signaling pulse is received at the time the No. 2 synchronizing pulse is applied to the inner grid of tube 511, condenser 521 would be discharged by a similar amount as illustrated by line 912, Fig. 9. Thereafter, the condenser will start to recharge in accordance with curve 922 which is similar to curve 921 except that it is displaced in time by the time between pulses. At the time of the fifth pulse, the condenser will have become recharged except for one-eighth of the amount of charge removed by the No. 2 pulse. If only the No. 3 signaling pulse is received, the same action takes place as illustrated by curves 913 and 923. In this case, the condenser remains one-fourth discharged at the time of the fifth pulse. If the No. 4 pulse is received the condenser will remain half discharged at the time the fifth pulse is received.

In the foregoing description of the action of the condenser and resistance circuit, it is assumed that only one of the pulses is received during the time assigned to a code group of pulses. If more than one pulse is received, as will be the usual case, during the time assigned to a code group of pulses, the amount that the condenser 512 remains discharged at the time the No. 5 pulse is received is merely the sum of the amount the condenser remains discharged at this time in response to the reception of the respective pulses as described above. In other words, the effects produced by any combination of pulses during the time assigned to a given code combination of pulses is the sum of the effects produced by the individual pulses.

The upper terminal of condenser 512 is connected to the cathode of tube 514. Tube 514 is normally biased so that substantially no current flows in its anode circuit. However, upon the application of a sampling pulse to the control grid of tube 514 from the delay line 520, a pulse of charge flows in the anode circuit of tube 514 which is that required to recharge the condenser. In other words, the higher the potential of the cathode of tube 514, the smaller the magnitude or amplitude of the output pulse of tube 514. Conversely, the lower the potential of the cathode of tube 514, the greater the magnitude of the output pulse from tube 514. A suitable time for the sampling pulse is illustrated in Fig. 9 by lines 908 and 918 which may occur any time after the last, i. e., the No. 5 pulse in the exemplary system described herein, of any particular code combination and before the No. 1 pulse of the succeeding code combination. It will be apparent that the gain or magnitude of the output from the decoding equipment may be controlled by selecting the time of sampling the voltage across condenser 512, i. e., the sooner after the fifth pulse the greater the output. During the time interval between the last pulse of one code group and the synchronizing pulse preceding the next code group the amount the upper terminal of condenser 512 remains discharged will be proportional to the magnitude of the sample of the original complex wave represented by the code group of pulses received and applied to the network comprising the condenser 512 and resistances 513 and 525. Consequently, since the greater the discharge of the condenser the lower its potential, the pulse output from tube 514 will have a magnitude which is proportional to the magnitude of each of the samples of the complex wave applied to the system at the transmitting station.

These pulses are applied to low-pass filter 515 which removes the high frequency components from them and in effect reconstructs a complex wave form similar to the complex wave form applied to the system at the transmitting station. This complex wave form is transmitted through the terminal equipment 516 to a receiving device 517. The terminal equipment 516 and the receiving device 517 may comprise any of the types of equipment described above with reference to the terminal equipment 311 and the signaling source 310.

In order more fully to explain the decoding action of the condenser 512 and resistances 513 and 525, reference is made to Fig. 9 which shows the wave form of the potential of the upper terminal of condenser 512 in response to the code combination assumed above in which a current pulse is transmitted during the first, second and fifth pulse times but no current pulse is transmitted during the third and fourth pulse intervals. The dotted line 930 represents the synchronizing pulse which is transmitted over conductor 340. Line 931 represents the amount of charge removed from the upper terminal of condenser 512 in response to the pulse received during the first pulse interval. Curve 941 illustrates the recharging of condenser 512 during the time between the first and second pulses. Line 932 represents the additional charge removed from condenser 912 in response to the reception of the second current pulse which is received during the second pulse interval. Curve 942 represents the recharging of condenser 512 during the time interval between the reception of the second current pulse and the current pulse received during the No. 5 pulse interval. Line 935 represents the amount of charge removed from the condenser by the current pulse received during the fifth pulse interval. Thereafter, the condenser starts to recharge in accordance with the dotted curve 945. The magnitude of curve 945 at any particular instant of time will be a function of the amplitude of the samples of the original complex wave transmitted over the system, that is, $1+2+0+0+16=19$ units or $^{19}/_{32}$ of the total maximum possible charge. By selecting a predetermined instant of time after the No. 5 pulse has been received, for sampling the magnitude of curve 945, a series of pulses having magnitudes which are functions of the magnitudes of the samples of the original complex wave are generated and transmitted through the low-pass filter 515 to the receiving device 517.

While the circuits of Fig. 5 have been arranged to cause the signal pulses to normally discharge the upper terminal of condenser 512, as described above, they may be equally well arranged to cause the upper terminal of this condenser to be normally charged, in which case the associated resistances will cause it to discharge instead of to charge but in the same manner as described above. The equivalence of charging and discharging a condenser is well known by persons skilled in the art, so that either arrangement may be selected at will, depending upon the various circuit constants and features of other associated circuits.

As described above, current flows in the output circuit of tube 511 only upon the simultaneous application of a timing or synchronizing pulse to its inner grid and a signaling pulse to its other control grid. The synchronizing or timing pulses applied to the inner or control grids of these tubes are frequently called gate pulses. These pulses are employed to select the most desirable portion of the signaling pulses, and they may be timed relative to them by means of timing delay equipment included either in the amplifier 510 or amplifier 519. These pulses may be further shaped and have their length controlled by additional pulse-shaping equipment connected in each of the leads from the delay line or from tubes 521, 522, 523, etc. The portion of the signaling pulse selected may also be controlled by changing the connections from tubes 521 through 523, inclusive, to delay line 520 as is well understood by persons skilled in the art.

By employing a gate or timing pulse for selecting a particular portion of the received signals, a two-fold advantage is obtained. In the first place, the portion of the received signal which has the greatest amplitude or which is the most reliable or both may be selected. In the second place, the noise upon the transmission channel caused by static and other spurious and interfering currents is eliminated except during the time of the application of the timing or gating pulses to the inner control grid of tube 511. This arrangement greatly reduces the effect of noise and in effect improves the signal-to-noise ratio of the entire system, thereby improving the reliability of transmission over communication channels.

In addition tube 511 in reforming and retiming the pulses as described above improves the operation of the decoding network first by making all the pulses applied to it of the same magnitude, duration and shape and by accurately timing the application of the pulses to this decoding circuit.

Persons skilled in the art will at once understand that tube 511, amplifier 510, together with suitable synchronizing apparatus, similar to delay line 520 and related equipment, for example, may be employed as regenerative repeater equipment for reshaping and retiming the pulses at one or more intermediate points when desirable or necessary.

As will be readily apparent to persons skilled in the art, there are many alternative methods in the apparatus for securing the various functions set forth above which would work equally well with those described in the exemplary system disclosed herein. These alternative arrangements will therefore be well within the scope of the present invention as defined in the claims appended hereto.

What is claimed is:

1. In a communication system, apparatus responsive to a complex wave form, a condenser, equipment for storing a charge upon said condenser which is a function of the amplitude of said complex wave form at a predetermined instant of time, other apparatus for discharging said condenser in a plurality of steps, a binary counting system comprising a plurality of stages for counting the number of steps required to discharge said condenser to a predetermined potential, pulse transmission means for transmitting a pulse representative of the condition of each of said binary counting stages at the end of the count, and apparatus for causing the pulse representing the condition of the units stage of said binary counter to be transmitted first, and other equipment for thereafter transmitting pulses representing the condition of the succeeding stages of said counter.

2. In a communication system, apparatus responsive to a complex wave form, a condenser, equipment for changing the charge on said condenser under control of said apparatus responsive to the complex wave form, apparatus for restoring the charge on said condenser to its initial condition in a plurality of steps of uniform magnitude, equipment for counting the number of steps of said uniform magnitude required to restore the charge on said condenser to substantially the initial condition, and distributor apparatus for transmitting pulses representing digits of the lowest denomination in the number of said steps followed by pulses representing digits of successively higher denominations in the number of said steps required to restore said condenser to its initial condition.

3. In a communication system in which successive samples of the message wave are each represented by a series of pulses each of one of a plurality of signaling conditions, the successive pulses of each series representing successively different fractions of the maximum possible magnitude of the respective sample, an electrical energy storage device, means responsive to each pulse of one of said signaling conditions for producing a predetermined change in the energy stored in said device, means for causing said stored energy to change during each pulse interval by an amount proportional to the relation of said fractions, and a signal circuit responsive to the value of said stored energy at the end of each series of pulses.

4. In a communication system in which successive samples of the message wave are each represented by a series of pulses, each of one of a plurality of signaling conditions, the successive pulses of each series representing successively different fractions of the maximum amplitude capacity of the system, an electrical energy storage device, means responsive to each pulse of one of said signaling conditions for producing a predetermined change in the energy stored in said device, means for causing said stored energy to change during each pulse interval in the opposite sense to the change produced by said pulses and by an amount proportional to the relation of said fractions, and a signal circuit responsive to the value of said stored energy at the end of each series of pulses.

5. In a communication system in which successive samples of the message wave are represented by a series of pulses each of one of two signaling conditions, successive pulses representing successive different fractions of the maximum amplitude capacity of the system, said fractions being related in accordance with successive powers of two, an electrical energy storage device, means responsive to each pulse of one of said signaling conditions for producing a predetermined change in the energy stored in said device, means for causing said stored energy to change during each pulse interval by one-half its value at the beginning of the interval, and a signal circuit responsive to the value of said stored energy at the end of each series of pulses.

6. A combination according to claim 5 in which said means for causing said stored energy to change causes a change in the sense opposite to the change produced by said pulses.

7. In a communication system, in which successive samples of a message are transmitted by code groups of pulses of the same number in each group, each pulse being of one of a plurality of different signalling conditions and the successive pulses of each code group representing successively greater fractions of the maximum capacity of the system, said fractions bearing a fixed predetermined relation to each other, a condenser and resistance network having a time constant such that the change in potential thereacross during each pulse interval bears the same relation to the potential at the beginning of the interval as said fractions bear to each other, means for establishing a predetermined reference change on said condenser at the beginning of each of said code groups of pulses, means responsive to said code groups of pulses for changing the charge on said condenser by the same definite amount in response to each pulse of one of said signalling conditions but not of another and substantially concurrently with such pulse, and an output circuit responsive to the potential across said condenser and resistance network at the end of each code group of pulses.

8. In a communication system in which each successive sample of the message wave is transmitted as a code group of uniformly spaced pulses each of one of two different characteristics, the successive pulses of each group representing successively greater fractions of the maximum amplitude capacity of the system, said fractions bearing a fixed predetermined relation to each other, a condenser and resistance network having a time constant such that the charge thereon varies during any single pulse interval by an amount bearing the same relation to the charge at the beginning of the interval as said predetermined relation of said fractions, means for establishing the same predetermined reference charge on said network at the beginning of each of said code groups, means responsive to each pulse of only one of said characteristics for producing concurrently with such pulse a finite change in the charge on said network, the magnitudes of said finite charges all being identical, and a signal circuit responsive to the charge on said network at the end of each code group of pulses.

References Cited in the file of this patent

UNITED STATES PATENTS

| | | |
|---|---|---|
| 1,613,686 | Vernam | Jan. 11, 1927 |
| 2,326,584 | Van Zelst | Aug. 10, 1943 |
| 2,398,490 | Atwood | Apr. 16, 1946 |
| 2,430,139 | Peterson | Nov. 4, 1947 |
| 2,438,908 | Goodall | Apr. 6, 1948 |
| 2,449,467 | Goodall | Sept. 14, 1948 |
| 2,451,044 | Pierce | Oct. 12, 1948 |